No. 828,528. PATENTED AUG. 14, 1906.
H. A. BALCOME.
ELECTRIC MOTOR AND BRAKE.
APPLICATION FILED NOV. 30, 1904.
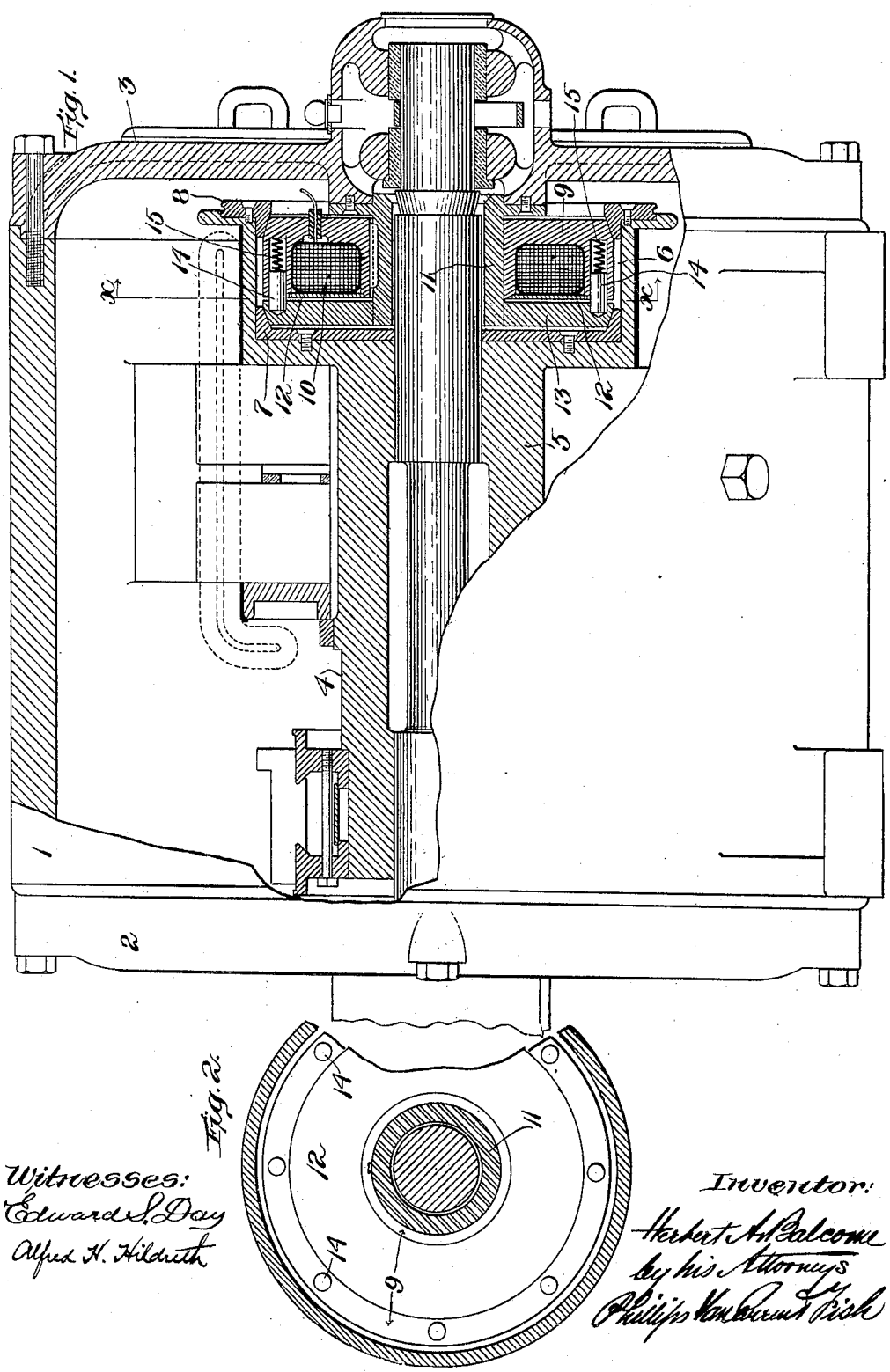
Witnesses:
Edward S. Day
Alfred H. Hildreth
Inventor:
Herbert A. Balcome
by his Attorneys
Philipp Van Brunt Fish

UNITED STATES PATENT OFFICE.

HERBERT A. BALCOME, OF BOSTON, MASSACHUSETTS, ASSIGNOR TO B. F. STURTEVANT COMPANY, OF BOSTON, MASSACHUSETTS, A CORPORATION OF MASSACHUSETTS.

ELECTRIC MOTOR AND BRAKE.

No. 828,528.   Specification of Letters Patent.   Patented Aug. 14, 1906.

Application filed November 30, 1904. Serial No. 234,834.

*To all whom it may concern:*

Be it known that I, HERBERT A. BALCOME, a citizen of the United States, residing at Jamaica Plain, Boston, in the county of Suffolk and State of Massachusetts, have invented certain new and useful Improvements in Electric Motors and Brakes; and I do hereby declare the following to be a full, clear, and exact description of the invention, such as will enable others skilled in the art to which it appertains to make and use the same.

The present invention relates to an improvement in electric motors, and more particularly to electric motors provided with automatic electromagnetic brakes.

It is desired in many uses of electric motors to provide means for applying a brake to the armature when the motor is stopped either by intention or by accidental means, such as the breaking of the circuit which drives the motor.

To this end the object of the present invention is to produce an electric motor provided with braking mechanism operating to apply the brake when the motor is stopped; and the invention consists in the devices and combinations of devices hereinafter described and claimed.

In the accompanying drawings, illustrating the preferred form of the invention, Figure 1 is an elevation, principally in section, of an electric motor provided with the braking mechanism of the invention; and Fig. 2 is a section taken on the line *x x*, Fig. 1, looking in the direction of the arrow.

The motor consists of a frame 1, provided with heads 2 and 3, which carry the bearings for the shaft of the armature 4. The armature-core 5 is provided in one end with a space 6, which is incidental to the form of the armature in the type of motor illustrated. This space in motors of this type as they have been heretofore constructed has been unoccupied, and it is proposed according to the present invention to place the braking mechanism within this space. Two friction-brake members are secured to the armature-shaft in the space 6, above referred to. The brake member 7, consisting of a disk with a laterally-projecting flange, is secured by means of screws to the core 5 of the armature, and the brake member 8 is similarly secured by means of screws to the projecting flange of the armature-core 5. Between these two friction-brake members is located the electromagnetic braking mechanism, which consists of a magnet and a brake armature provided with braking surfaces to coöperate with the above-described friction-brake members. The magnet consists of a hollow ring-shaped body 9, within the annular space of which is received the magnetic coil 10. The magnet-body 9 is supported upon a sleeve 11, which is secured to the head 3 of the motor. The magnet-body 9 is longitudinally movable upon the said sleeve, but splined thereto in order to hold it rotatively stationary. The coil 10 is covered by a cover-plate 12, of insulating or non-magnetic material, such as fiber, recessed into the face of the magnet-body. The brake-armature 13 is a disk, corresponding in size to the magnet-body, which is mounted upon the sleeve 11 and held from rotation thereon by means of pins 14, which project from holes in the magnet-body into holes in the brake-armature. The pins 14 are normally pressed into engagement with the brake-armature by means of springs behind them. The magnet-body and armature comprise two movable and rotatably stationary friction-brake members adapted, respectively, to engage the brake members secured to the armature-shaft. The above-described construction is such that when the coil 10 is energized by a current it attracts the armature 13 and compresses the springs 15, supporting the pins 14, pulling the magnet-body and armature toward each other and out of contact with the friction members upon the armature-shaft. Thus the brake is released when the magnet is energized.

It will be noted that the springs normally operate to apply the brake and that the magnet comprises electromagnetic means for collapsing the movable brake members and releasing the brake. The movable brake members oppose each other. They thrust against each other and against the brake members upon the armature-shaft, and thus apply the brake without exerting any force upon the armature tending to move it endwise in its bearings.

It will be observed that the construction is economical of space in that it employs a space hitherto unused, that it does not increase the over-all dimensions of the motor, and affords an efficient and convenient means for providing an electric motor with a brake. It is unessential to the present invention where the space within the armature is located, because the brake may be located wherever in the armature it is found convenient to put it. The form of the invention, however, in which the brake is located in a space in one end of the armature is preferred, because this is the construction of a type of armature which obtains in general use and which is particularly adapted for this purpose.

Having thus described the invention, what is claimed is—

1. An electric motor, having, in combination, an armature having a space therein, its shaft, and a friction-brake located in said space in the armature, substantially as described.

2. An electric motor, having, in combination, an armature having a space therein, its shaft, and a friction-brake and electromagnetic means for operating the brake located in said space in the armature, substantially as described.

3. An electric motor, having, in combination, an armature, its shaft, two opposed friction-brake members secured to the armature-shaft, two movable rotatively stationary friction-brake members located between said opposed brake members, a spring for forcing said last-named brake members into contact with the armature-brake members, and electromagnetic means for collapsing the movable brake members, substantially as described.

4. An electric motor, having, in combination, an armature, its shaft, two opposed friction-brake members secured to the armature-shaft, two movable brake members located between the armature-brake members, and spring and electromagnetic operating mechanism for the movable brake members, substantially as described.

5. An electric motor, having, in combination, a casing, an armature journaled therein and provided with a brake-surface, a coöperating brake member located between the armature and the end of the casing and prevented from rotation by connection with the casing, and electromagnetically-controlled means for moving the brake-surfaces into operative contact, substantially as described.

6. An electric motor, having, in combination, a casing, an armature journaled therein and provided with an annular recess, oppositely-disposed conical brake-surfaces located in the recess and fixed to the armature, an expanding electromagnetically-controlled brake located in the recess and having oppositely-disposed brake-surfaces for coöperating with the brake-surfaces on the armature, and connections between the casing and the brake to prevent rotation of the latter, substantially as described.

7. An electric motor, having, in combination, a casing, a shaft journaled therein, a sleeve fixed to one end of the casing and projecting inwardly, and annular with respect to the shaft, two brake members mounted on the sleeve free to move longitudinally thereon but not to rotate, an armature mounted on the shaft within the casing and provided with an annular portion surrounding the brake members, two oppositely-disposed brake members fixed to the said annular portion of the armature, springs normally tending to force the non-rotary brake members into contact with the rotary brake members, and a magnet located within the casing for drawing the brake members out of contact, substantially as described.

In testimony whereof I affix my signature in presence of two witnesses.

HERBERT A. BALCOME.

Witnesses:
HORACE VAN EVEREN,
FARNUM F. DORSEY.